(12) United States Patent
Georgiou et al.

(10) Patent No.: US 7,003,597 B2
(45) Date of Patent: Feb. 21, 2006

(54) DYNAMIC REALLOCATION OF DATA STORED IN BUFFERS BASED ON PACKET SIZE

(75) Inventors: Christos John Georgiou, Scarsdale, NY (US); Valentina Salapura, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 249 days.

(21) Appl. No.: 10/604,295

(22) Filed: Jul. 9, 2003

(65) Prior Publication Data

US 2005/0008011 A1    Jan. 13, 2005

(51) Int. Cl.
*G06F 12/02* (2006.01)

(52) U.S. Cl. .................... 710/56; 710/53; 711/171; 711/170; 711/165

(58) Field of Classification Search ........... 710/56, 710/53; 711/171, 170, 165
See application file for complete search history.

(56) References Cited

U.S. PATENT DOCUMENTS

| | | | |
|---|---|---|---|
| 5,117,486 A * | 5/1992 | Clark et al. ............ 710/307 |
| 5,289,470 A * | 2/1994 | Chang et al. ............ 711/173 |
| 5,313,645 A | 5/1994 | Rolfe | |
| 5,508,968 A | 4/1996 | Collins et al. | |
| 5,519,664 A | 5/1996 | Collins et al. | |
| 5,555,528 A | 9/1996 | Collins et al. | |
| 5,588,152 A | 12/1996 | Dapp et al. | |
| 5,590,345 A | 12/1996 | Barker et al. | |
| 5,594,918 A | 1/1997 | Knowles et al. | |
| 5,710,935 A | 1/1998 | Barker et al. | |
| 5,717,943 A | 2/1998 | Barker et al. | |
| 5,752,255 A | 5/1998 | Jarvis | |
| 5,794,059 A | 8/1998 | Barker et al. | |
| 5,920,732 A * | 7/1999 | Riddle ............ 710/56 |
| 6,199,121 B1 | 3/2001 | Olson et al. | |
| 6,330,639 B1 | 12/2001 | Fanning et al. | |
| 2004/0085977 A1 * | 5/2004 | Gaur ............ 370/412 |

FOREIGN PATENT DOCUMENTS

WO    WO9419748 A2    9/1994

OTHER PUBLICATIONS

Ferrari et al. "Buffer Space Allocation for Real-Time Channels in a Packet-Switching Network". 1991, pp. 1-20.*
PARADISE: An Advanced Featured Parallel File System by Maciej Brodowicz and Olin Johnson.
IBM TDB/DOSS, RD n444 Apr. 2001 Article 16 p. 654, "Fast, Shared, Memory With Multiple Output Queues for Variable Length Packets, Made from Slow Memory Elements".

(Continued)

*Primary Examiner*—B. James Peikari
(74) *Attorney, Agent, or Firm*—Richard Kotulak; Greenblum & Bernstein P.L.C.

(57) ABSTRACT

A method and system is provided to efficiently manage memory in a network device that receives packets of variable size. The memory is allocated into portions whereby each portion, comprising multiple equally-sized buffers, receives packets of a particular size. One portion is used for smaller packet sizes and another portion is for larger packet sizes, although other portions may be created. As packets are received at the network device, they are stored into the appropriate memory portion based on their size. The number of available buffers in each portion is monitored so that, when it falls below a threshold, buffers are reallocated to the other thereby increasing the overall memory efficiency.

23 Claims, 10 Drawing Sheets

OTHER PUBLICATIONS

Object Resizing and Reclamation through the use of hardware, by Witawas Srisa.

IBM TDB n3 Aug. 1992 pp. 382-385 "Data Transfer with Virtual Memory Queus".

* cited by examiner

DYNAMIC REALLOCATION OF DATA STORED IN BUFFERS BASED ON PACKET SIZE

BACKGROUND OF INVENTION

1. Field of the Invention

The invention generally relates to the implementation of computer networks, and more particularly, to a method and apparatus for efficient utilization of memory and reduced memory waste in storing data blocks of network traffic.

2. Background Description

In networks that employ various network protocols such as, for example, the Internet Protocol (IP) stack family and Fibre Channel protocol, packets are sent and received of varying sizes to deliver a wide variety of contents and messaging information including, for example, data, video, voice, control information, etc. In order to process these packets at the receiving side, e.g., a network interface, various techniques are used to manage the incoming stream of varying sizes of packets.

Typical arrangements include employing some form of logic, either hardware centric or software centric, to receive and temporarily store the incoming packets in a memory area, e.g., a buffer pool or equivalent, until subsequent processing can access and retrieve the packets, as appropriate, for action on the packet contents. These arrangements may also employ distributed processing or centralized processing.

This interaction between a network interface logic and subsequent processing often employs various types of buffering arrangements to manage the sequencing of the packets in the buffer pools so that arrival sequences are maintained in time ordered, or otherwise, sequence ordered relationship to one another. Often packets will contain sequencing information so that re-arrangement can occur to place information in proper order as necessary.

Additionally, observation and analysis of network traffic in various applications shows that transmitted packets typically fall within ranges of relative sizes, (e.g., small packets or big packets, etc. ). For example, for the Fibre Channel protocol, packets can range between a minimal packet size of 36 bytes to 2112 bytes. However, 50% of all packets exchanged are smaller than 100 bytes, whereas substantially the other half of packets are in the range of 1500 bytes and larger. Other protocols tend to exhibit similar statistical groupings of packet sizes and may have more groups or different ratios.

Typically. in network handlers interfaces, when packets arrive from the network at an input port, the hardware attached to the port usually communicates this information to a processor which performs routing actions and then passes the processed packet to an output port for delivery to its intended destination. The hardware attached to the input port is often a simple DMA circuit that receives the packet, writes it to memory, and then indicates to the controlling processor that a packet has been received.

The DMA controller is typically set up by using several registers which are written by the host processor. One of these registers contains the address of the memory area where the next packet received from the network is going to be stored. As the size of the packet is not known in advance, the assigned memory area is typically sized to fit the biggest packet allowed by the particular network protocol to avoid loss of data. As a result, memory is used inefficiently, as big chunks of memory area are assigned for storing small packets.

An alternative approach uses multiple linked smaller buffers for storing a received packet. If the received packet does not fit in a single small buffer, then several of those smaller buffers are linked together as a linked list to store a single packet. This results in better memory utilization, however, this introduces significant complexity in handling the packets.

Yet another approach uses dynamical allocation of memory for each packet. This requires lengthy searches to locate the sufficient available consequent memory block to fit the received packet, using one of the space allocating algorithms such as "first fit" or "best fit". Drawbacks of this approach are that the search and allocation of the memory is slow, requiring the memory to be accessed and analyzed before an allocation can be made, as well as need for storing allocation information.

SUMMARY OF INVENTION

In an aspect of the invention, a method is provided to reallocate buffer memory in a network device comprising the steps of allocating memory into at least a first portion and a second portion, creating a buffer pool in the first and second portion wherein each buffer in the first buffer pool may be equally sized and associated with a predetermined packet size and each buffer in the second buffer pool may be equally sized and associated with another predetermined packet size. the method further includes monitoring usage of buffers in each buffer pool to determine whether the number of occupied buffers in either buffer pool crosses a threshold and triggering a reallocation of memory when the number of occupied buffers in either buffer pool crosses a threshold.

In another aspect, a system for a network device that receives packets of variable length is provided comprising a memory having a first portion and a second portion, the first portion storing packets having a length less than a predetermined value and the second portion storing packets greater than a predetermined value. A memory system reallocates the memory of the first portion and the second portion when the memory of at least one of the first portion and the second portion crosses a threshold.

In another aspect of the invention, a computer program product is provided which comprises a computer usable medium having readable program code embodied in the medium that includes a first computer program code to allocate memory into at least a first portion and a second portion. A second computer program code creates a buffer pool in the first and second portion, each buffer in the first buffer pool may be equally sized and associated with a predetermined packet size and each buffer in the second buffer pool may be equally sized and associated with another predetermined packet size. Also included is a third computer program code to monitor unused buffers in each buffer pool to determine whether the unused buffers in either buffer pool falls below a threshold, and a fourth computer code to trigger a reallocation of memory when the unused buffers in either buffer pool falls below a threshold.

BRIEF DESCRIPTION OF DRAWINGS

The foregoing and other objects, aspects and advantages will be better understood from the following detailed description of embodiments of the invention with reference to the drawings, in which.

DETAILED DESCRIPTION

This invention is directed to providing a flexible buffer management method and system for efficient utilization of memory and reducing memory waste in storing data blocks (e.g., packets) of network traffic. To implement the invention, in embodiments, after reception of a packet from the network interface, the packet is typically temporarily stored in an inbound buffer in the network interface from where it is then transferred to memory to await subsequent processing. This memory is allocated into two or more portions (i.e., buffer pools) according to packet sizes with buffers allocated in each portion suitable for storing packets according to the packet sizes associated with the portion. As packets arrive and are stored, buffers are used and released. If the number of used buffers in any portion crosses a threshold, a reallocation of memory from one portion to the other may occur. The invention further reduces memory waste due to the storing of all packets into the maximal sized memory chunks, and has benefits of simplicity associated with storing a packet in a single buffer instead of multiple linked buffers, thus offering better memory utilization and simple design. In addition, no memory search has to be made before an allocation is made.

Figure 1:
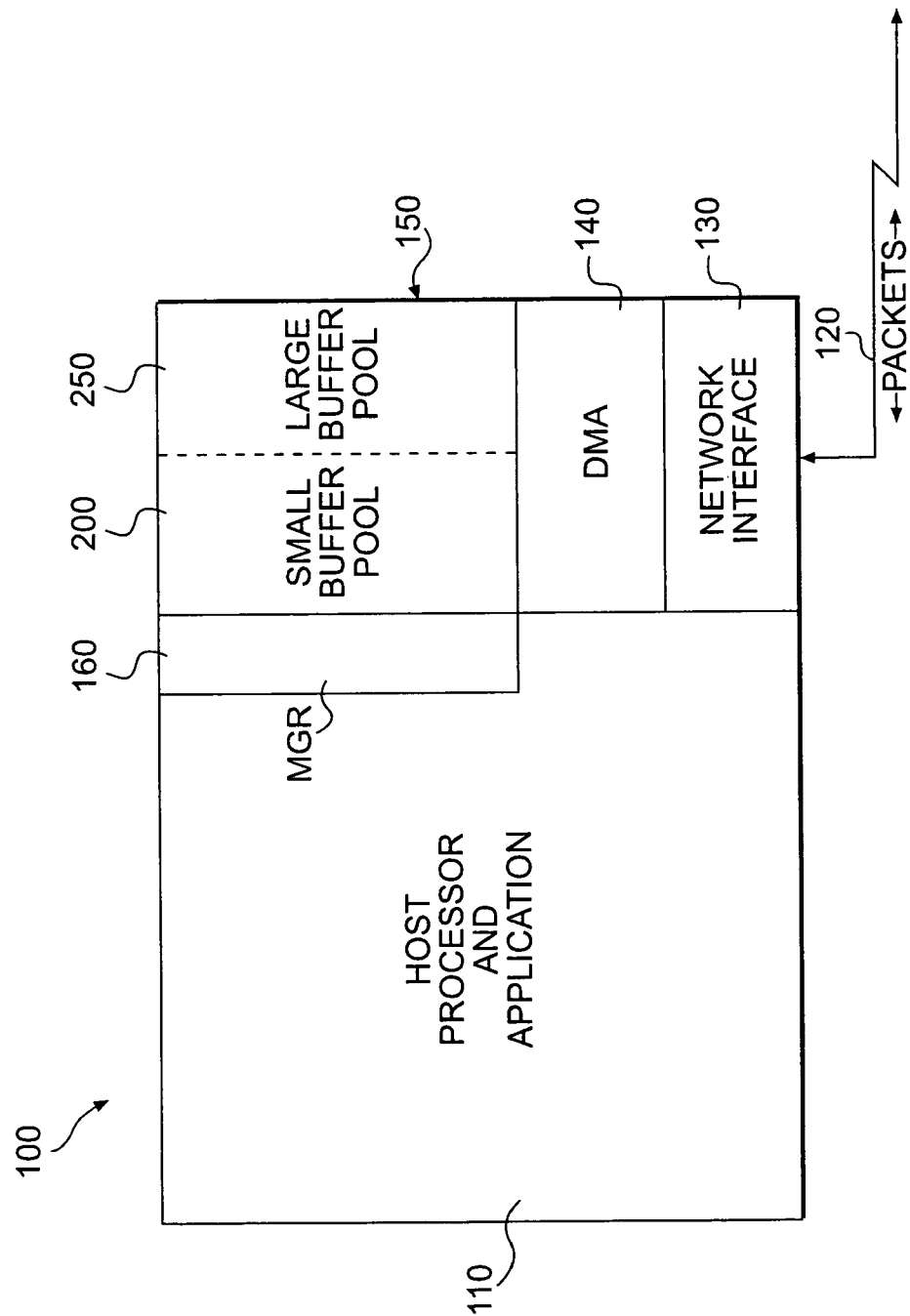
FIG. 1 is a block diagram showing an embodiment of an environment of the invention.

FIG. 1 is a block diagram showing an embodiment of an environment of the invention. A network device, generally shown as 100, typically includes a host processor and one or more applications 110. The network device 100 is connected to a network 120 for receiving and transmitting packets of data using various types of protocols via a network interface 130. The network interface 130 temporarily stores an incoming packet in its local memory until the incoming packet may be transferred via a direct memory access controller (DMA) (or equivalent) to a buffer pool such as small buffer pool 200 or large buffer pool 250. Any memory data structures (e.g., tables, linked lists, small buffer pool 200, large buffer pool 250, counters, timers, etc.) contained in the memory are typically under control of one or more memory manager components 160 as part of the host processor 110 complex, but may involve distributed architectures.

The memory buffer pools may be allocated in relation to the types of packet sizes expected at a receiving network device 100. This may include two or more types of buffer pool sizes with multiple buffers in each buffer pool. The buffers are typically sized according to traffic statistics obtained from communications over the network 120. This buffer sizing leads to optimization of memory utilization which is directly related to overhead costs such as memory costs, speed performance, packet processing reliability, and the like.

To transfer packets from the network interface to the memory buffer pools 200 or 250, a check is made to determine which size of buffer is needed to store the incoming packet and an appropriate sized buffer is acquired from the appropriate buffer pool. If a request for a buffer of a particular size causes the number of available free buffers in the pool to fall below a predetermined threshold, then a re-allocation of one or more buffers from one pool of a particular size to another buffer pool of a different size is triggered according to the invention.

By way of example, a DMA 140 may be used in the illustration of the dynamic nature of controlling buffer pools in memory, according to the invention. Once the DMA 140 is initialized by the host processor 110 and provided references to the small and large buffer pools 200 and 250, respectively, incoming packets are transferred by the DMA to the buffer pool for the appropriate sized packet. As the DMA transfers a packet into a small or large buffer, a memory manager 160 updates the DMA pointers to the next available free buffer area for the small or large buffer pool as appropriate. In other words, the memory manager keeps the DMA informed of where the next available free buffer area is available for either the next small or large packet.

Although the invention is described using two buffer size categories, i.e., small and large (or maximal), to illustrate embodiments of the invention, one of ordinary skill in the art would recognize that any number of buffer sizes and buffer pools could be utilized with appropriate modification to re-allocate buffers among multiple categories. Embodiments of the invention may be implemented with or without the use of linked lists, as necessary, for efficiency or preference considerations.

Figure 2A:
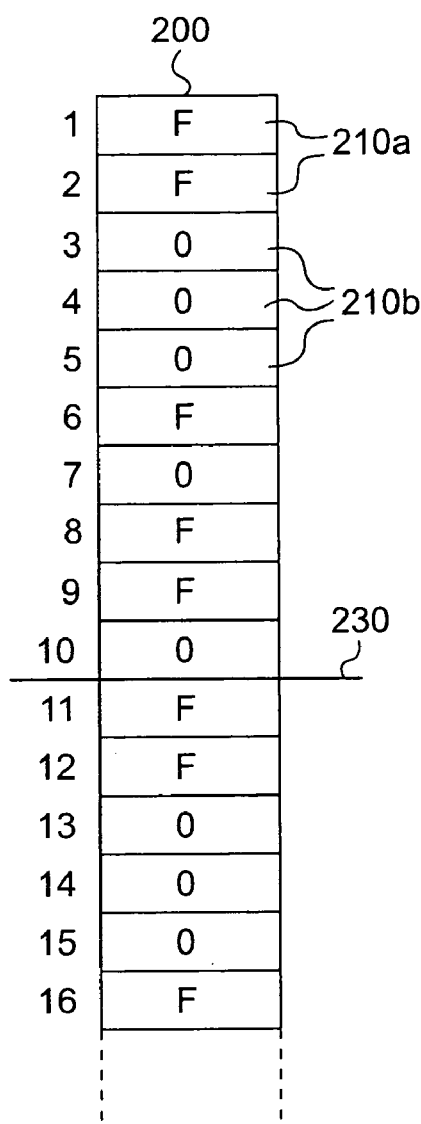
FIGS. 2A–2B are illustrations of allocated memory portions according to an embodiment of the invention.
Figure 2B:
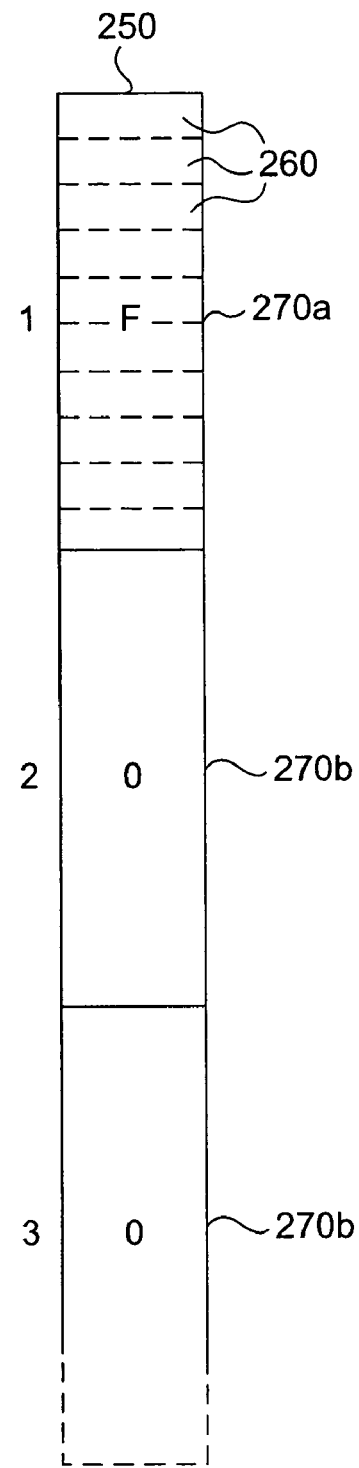

FIGS. 2A and 2B illustrate memory partitioning, according to an embodiment of the invention. Referring now to FIGS. 2A and 2B, two start addresses in memory may be provided by the memory manager 160 to the DMA (or equivalent), one pointing to a first portion of memory, which may be the small size buffer pool shown as reference numeral 200, and the other pointing to a second portion of memory which may be the large size buffer pool, shown as reference numeral 250. The relative size of each buffer pool is related to the expected ratio of amounts of packets associated with each buffer pool. For example, if half the number of packets are expected to be small size, then memory is allocated so that the number of small buffers (e.g., 210a and 210b) are substantially equal to the number of large buffers 270.

The sizes of the small and large buffers are predetermined and initialized during a startup and initialization process (or after a reset) of the network device 100 (or similar device) in which the invention provides memory management and reallocation. The buffer pool sizes are predetermined based upon statistical information of the packet sizes to be encountered during processing. However, over a period of time, historical data concerning changes in packet sizes may be collected. If a significant enough change occurs to the statistical base upon which buffer pools are currently sized, a re-sizing of buffer pools to re-allocate the buffers according to new statistical data may occur. This may translate into small size buffers becoming larger size buffers, or large size buffers may become smaller sized buffers. This may also mean that the overall total number of small buffers and large buffers may change accordingly as memory availability permits. Typically, the size of a large buffer is an integer multiple of a small buffer size.

In the examples of FIGS. 2A and 2B, ten small buffers 210a and 210b equal the size of one large buffer 270 as shown in FIG. 2B. FIG. 2A shows free small buffers 210a and occupied small buffers 210b. For ease of recognition, free buffers are shown with an F and occupied buffers with an O. Likewise, the large free buffers 270a are shown with an F and the occupied large buffers 270b are shown with an O. An occupied buffer contains a received packet of data waiting for further processing. A free buffer is available to receive a packet from the network interface 130.

In an embodiment, the buffers in a buffer pool are arranged in a linked list.3 shows an embodiment of a linked list 280 for managing buffers in a buffer pool such as the buffers of FIGS. 2A and 2B. Linked list operations is a data structure technique known to one of ordinary skill in the art and may involve various other configurations such as a doubly linked list or the like. The use of linked lists is but only one way to manage buffer pools. Other memory control structures may also be employed equally as well to track and manage buffers in buffer pools (e.g., bit-maps, lists, tables, etc) without departing from the scope of this invention.

Figure 3:
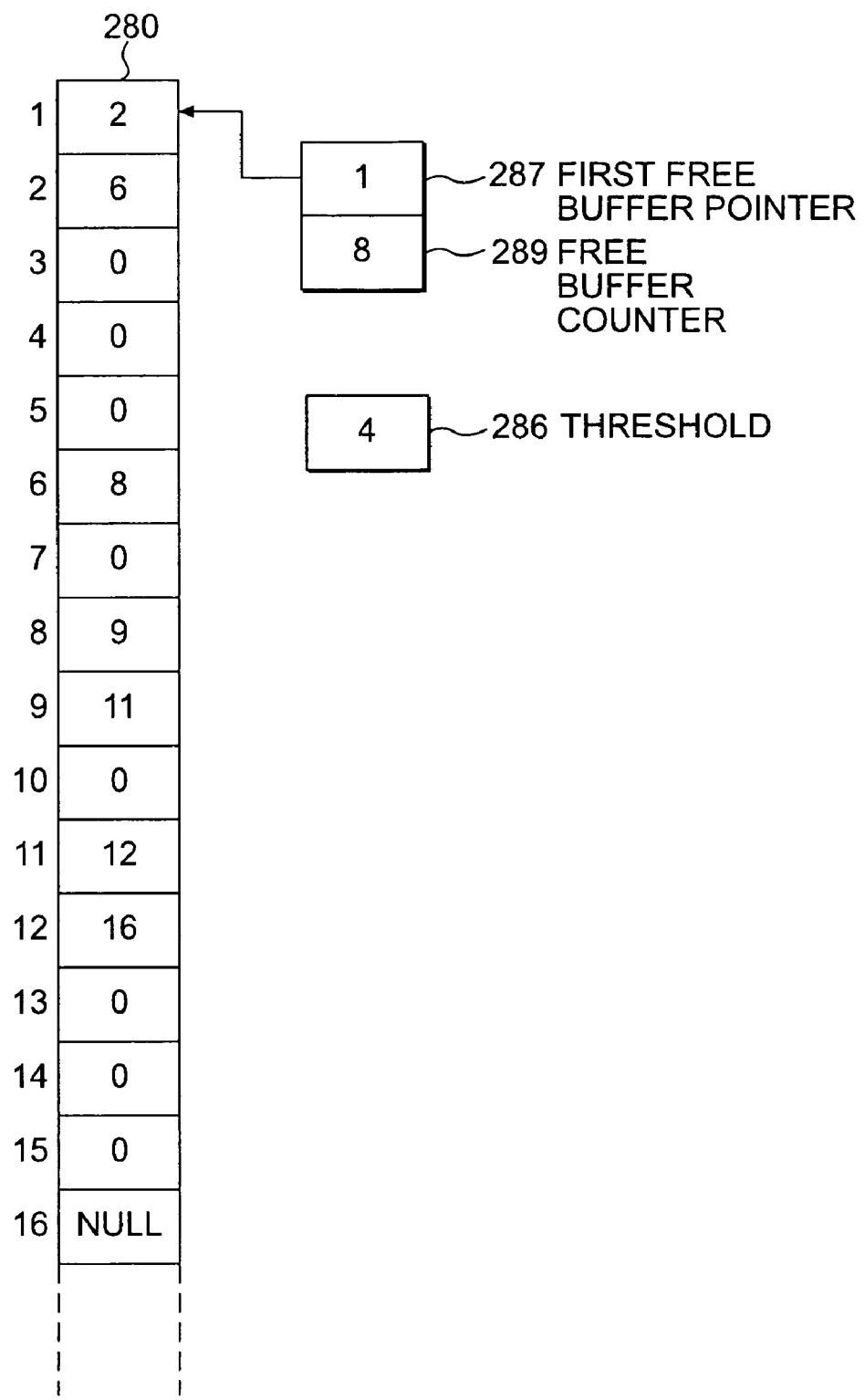
FIG. 3 is an illustration of a linked list during operation, according to an embodiment of the invention.

The exemplary linked list shown in FIG. 3 represents a linked list 280 corresponding to the small buffer pool 200 configuration as shown in FIG. 2A. The memory manager 160, or equivalent, typically manages this linked-list. This link list 280 includes a free buffer pointer 287 to buffer No. 1 of the small buffer pool 200 which is currently the next free buffer that will be used when another small packet arrives. A free buffer counter 289 is also maintained to keep track of the current count of free small buffers as small buffers 210 are used and freed. In this example, eight free small buffers 210a are currently available. Careful traversal of the link list 280 shows the linkages throughout the linked list 280. Free small buffer No. 1 is linked to free small buffer No. 2, which, in turn, is linked to free small buffer No. 6, etc. The last free small buffer is No. 16 and contains a terminator, e.g., NULL. Other techniques exist for implementing linked lists, however, this linked list represents one embodiment.

A threshold count 286 is also shown in FIG. 3. When the number of free (i.e., unused) small buffers falls below this threshold count (for this example, set to 4), a re-allocation of large buffers to small buffers occurs. Additionally, a threshold count exists for the large buffer pool and when falls below the threshold, causes re-allocation of small buffers to large buffers. The threshold, in embodiments may, alternatively, indicate how many buffers are occupied rather than free, but in either case, when buffers of a particular size category are running low on availability, a re-allocation occurs. In either case, a threshold is being crossed to indicate a type of buffer is running low on availability and may require re-allocation from another size buffer pool.

A corresponding link list and pointers also exists for the large buffer pool 250 but since its operation is parallel to the small buffer pool 200, it is not shown. The large buffer pool linked-list may also track free large buffers 270a and maintain a current count of free large buffers (alternatively, a count of occupied buffers may be maintained for either small or large buffers).

Dynamic Re-allocation of Buffers and Use of the Invention

The allocation of available memory area is performed dynamically. During the initialization of the system, the available memory area is partitioned into two sets of equal number of memory buffers, but where the size of buffer is small, for one set, and of the maximal packet, for the another set. However, this is dynamically changed during the running of the network application. If the number of available buffers in one set falls under a particular threshold, free memory area from the other set can be reassigned to the first set. To accomplish this, the buffer resizing is performed, i.e., big memory buffers are partitioned into a number of small buffers, and multiple small buffers are merged into a larger buffer. This dynamic reassignment of buffers makes system adaptable to sudden network traffic pattern change.

Whereas resizing of a big buffer into multiple small buffers is relatively straight forward, the merging of multiple small buffers into a big buffer is more complex, as all small buffers which are going to be merged have to be physically adjoined in the memory, and optionally, properly aligned. To solve this problem, an additional memory pointer is used, referred to as a reallocation boundary 230 (FIG. 2). Upon initialization of resizing, this pointer is set to a memory address corresponding to the new maximum allocation range of the small buffer array. It should be noted that buffers could still be allocated beyond this boundary, but new buffers will only be allocated below this buffer. Since the usage of packets is dynamic, i.e., all buffers are reclaimed after a fixed time period (due to the packets either expiring or being transmitted). Thus, after a predetermined time period, all buffers beyond the allocation boundary should be guaranteed to be free and then may be merged into a large buffer and be included into the pool of large buffers.

Figure 4:
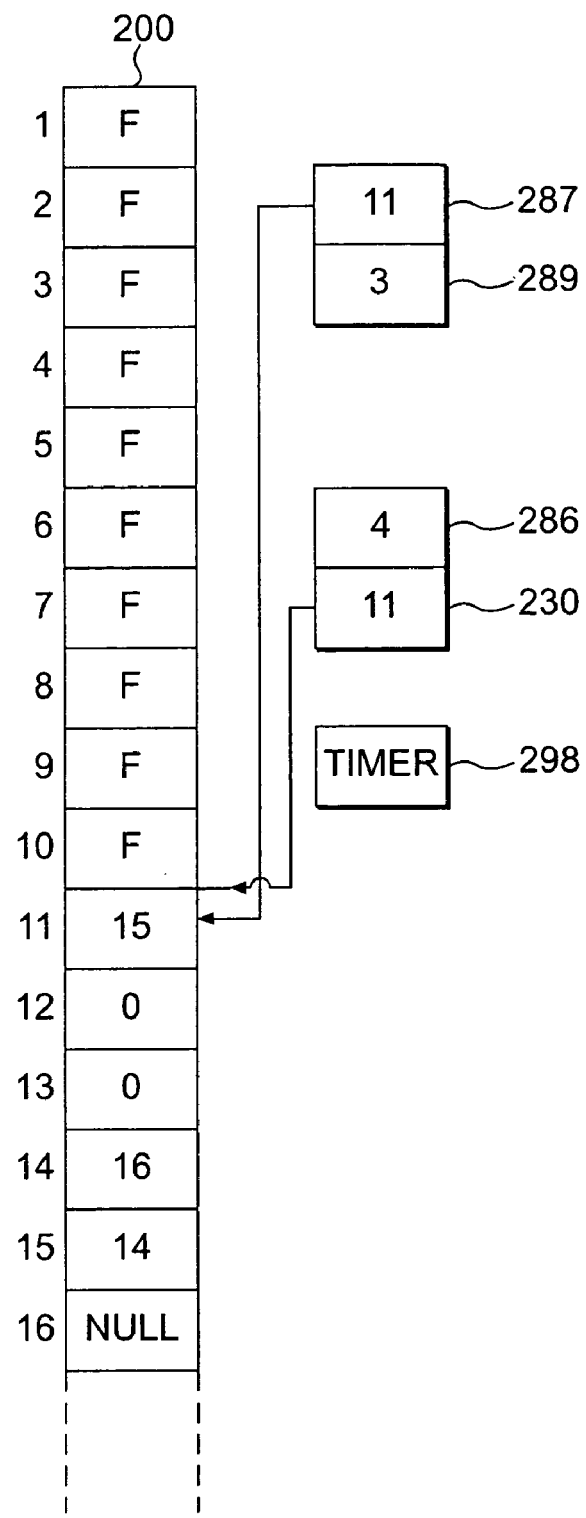
FIG. 4 is an illustration of a linked list during reallocation, according to an embodiment of the invention.

FIG. 4 is an embodiment of an intermediate stage of reallocation of small buffers to a large buffer and will be explained in conjunction with FIGS. 6A–6E. FIG. 4 shows the reservation range of the ten small buffers 210, Nos. 1–10, denoted by the reallocation boundary 230. The reallocation boundary 230 is set for the new boundary of the small buffers, to reallocate small buffers 1 to 10 for a new big buffer. All new requests for small buffers should be allocated below the reallocation boundary 230. The free buffer pointer 287 is updated to reference the first free buffer below the reallocation boundary (buffer No. 11 in the figure), and free buffer counter 289 is updated. As new packets arrive, they will be stored in small buffers below the buffer labeled 10, i.e., in buffers no. 11, 14, 15 and 16. Note that some of the buffers 1 to 10 may be occupied when the reallocation process starts, but after a determined amount of time (i.e., the reallocation time periods) all of these small buffers are necessarily free.

Figure 5B:
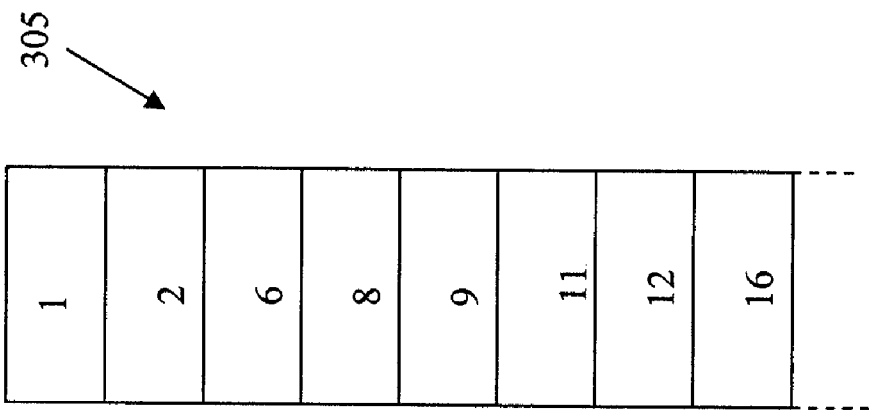
FIGS. 5A–5B are illustrations of an embodiment of a table/list for managing buffers.
Figure 5A:
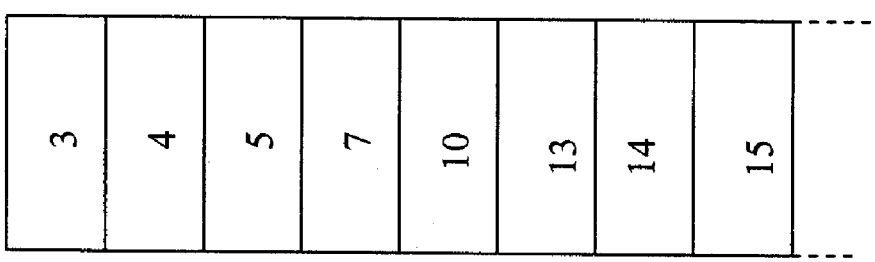

FIG. 5A is a table/list showing which small buffers 210 of FIG. 2A are occupied. In embodiments, this table/list, generally shown as reference numeral 300, is used to record all occupied buffers in a buffer area. This is at least one alternative to linked-lists as a tracking mechanism of occupied/unoccupied buffers. A similar table/list (not shown) may exist to record occupied buffers in the large buffer pool 250. Using this table/list 300, in order to determine if all buffers from the allocated area (i.e., area to be reallocated) are free (i.e., unoccupied), this table is searched for an entry belonging to the allocated area. In the example of FIG. 2A, this is the area demarcated by reference numeral 230, that is, the first ten small buffers 210. If such an entry is located in the table/list 300, there is at least one buffer still occupied, so that area can not be reallocated. The table/list 300 can be regularly polled until the area is free (or a timer employed), or it waits until the found entry is free before repeating the search of the table, or some other determinate is used for searching the table again. Once no entries belonging to the allocated area are found in the occupied buffer table, the allocated area can then be reallocated.

FIG. 5B is a table/list showing which small buffers 210 of FIG. 2A are free (i.e., unoccupied). In an embodiment, this free buffer table/list, generally shown as reference numeral 305, is used to record which small buffers 210 in the allocated area (i.e., area to be reallocated) are free (i.e., unoccupied). Again, this table/list 305 can be repeatedly scanned/searched at a predefined time interval, or for the first entry that has been determined to be missing (i.e., occupied), and then the search can be repeated for other missing entries. A similar table/list (not shown) may exist for the large buffer pool 250 and maintained in like fashion. This is at least one alternative to linked-lists. Table/list 300 and 305 may also represent a bitmap wherein each entry is a bit showing either free entries or occupied entries.

FIGS. 6A–6E shows steps of using the invention. FIGS. 6A–6E may equally represent a high-level block diagram of the invention implementing the steps thereof. The steps of FIGS. 6A–6E may be implemented on computer program code in combination with the appropriate hardware. This computer program code may be stored on storage media such as a diskette, hard disk, CD-ROM, DVD-ROM or tape, as well as a memory storage device or collection of memory storage devices such as read-only memory (ROM) or random access memory (RAM). Additionally, the computer program code can be transferred to a workstation over the Internet or some other type of network.

Figure 6A:
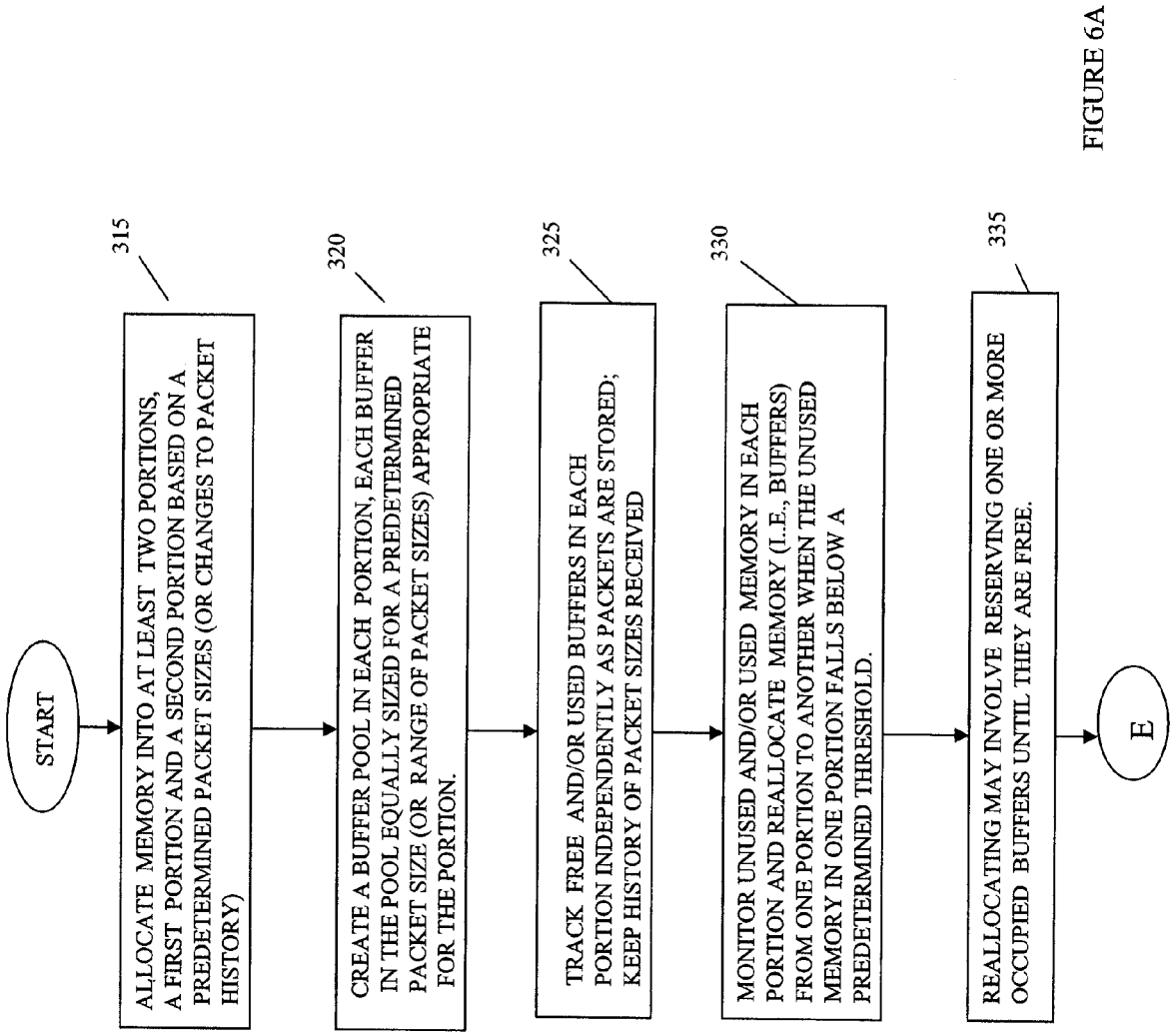
FIGS. 6A–6E are flow diagrams showing steps of using the invention.

FIG. 6A is flow diagram showing general steps of using the invention beginning at step 315 where memory is allocated into at least two portions, a first portion and a second portion based on predetermined packet sizes. The packet sizes typically are evaluated statistically into two or more groups as anticipated for a protocol environment. At step 320, buffer pools are created in each portion, each buffer in the pool equally sized for a predetermined packet size (or range of packet sizes) appropriate for the portion of memory. At step 325, the buffers are tracked to monitor free and/or used buffers in each portion independently as packets are stored and processed. A history of the actual packet sizes processed is maintained for possible eventual reallocation of memory portions if network traffic characteristics change.

Continuing at step 330, unused and/or used memory in each portion is monitored and a reallocation of memory from one portion to another portion is performed when the unused memory in one portion falls below a predetermined threshold. At step 335, reallocating may involve reserving one or more occupied buffers until they are free. This may also involve setting a timer to insure that the occupied buffer has sufficient time to be emptied according to an anticipated consumption rate of the incoming packets. The process then ends until a new allocation of memory is desired based upon a request for reinitialization or new statistical information on packet sizes. However, the dynamic operation of processing packets and reallocation of the portions of memory may continue as described in more detail as follows.

Figure 6B:
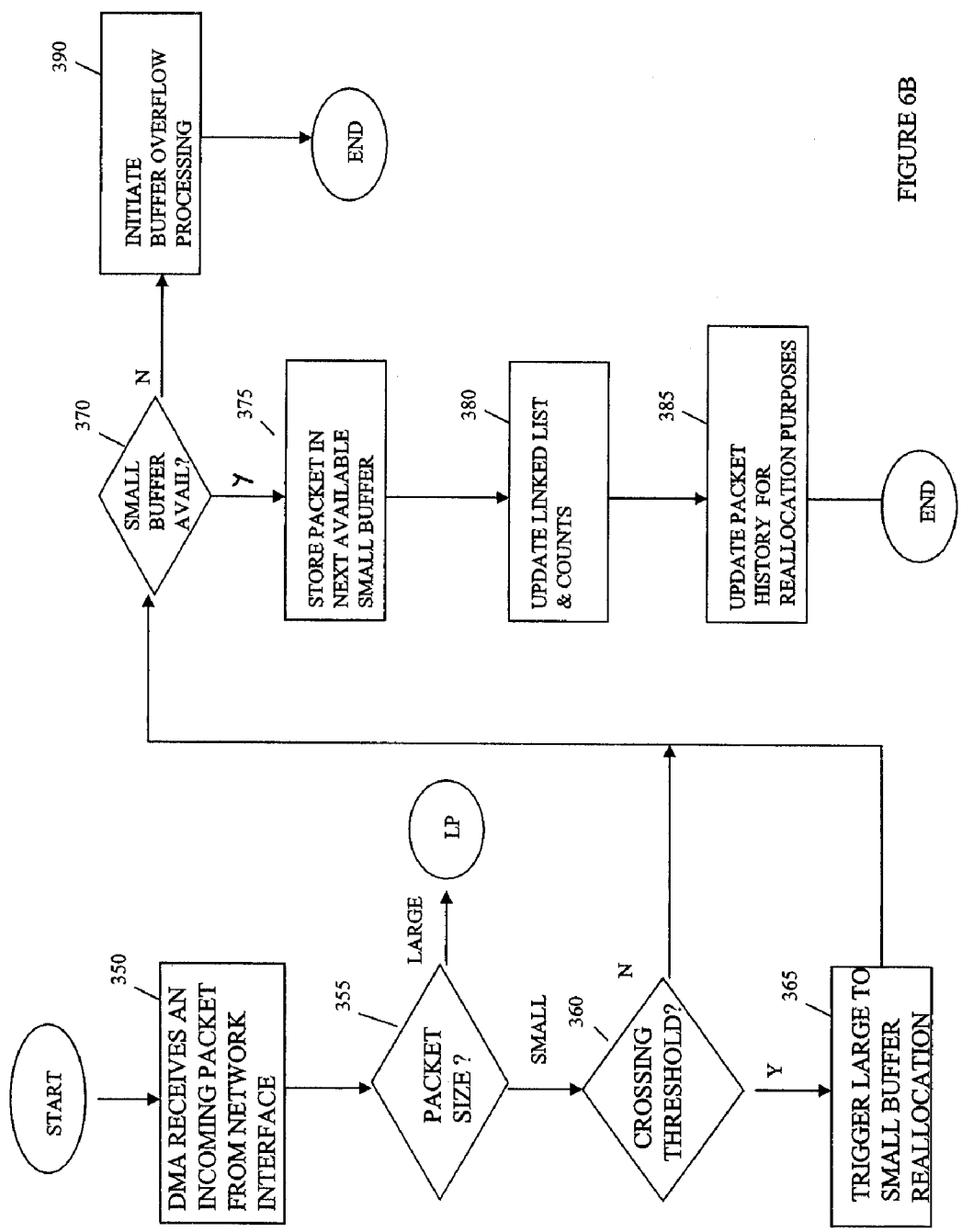

Referring to FIG. 6B, beginning at step 350, the network device 100 receives a packet of data via the network interface 130 and is transferred to memory 150 by a DMA 140 (or equivalent). For each new DMA transfer, the memory manager checks the status registers for the DMA controller to obtain the information if a small or large packet buffer was used for the previous transfer, and then provides the new pointer to a new area (i.e., buffer) of corresponding size to the DMA controller, i.e., if the last transfer was to a small buffer, then a new small buffer address is provided.

Continuing at step 355, a check is made to determine whether the current received packet is a small or large packet. If a large packet, processing continues at LP (FIG. 6C), otherwise if a small packet, a check is made at step 360 to see if the new small packet is about to cross a predetermined threshold count for the number of free versus occupied small buffers. At step 365, if the threshold count is being crossed a reallocation procedure is triggered.

Processing continues in either case to step 370 where a check is made to see if a small buffer is available (i.e., free). If a small buffer is not free, then at step 390, buffer overflow processing is initiated to perform a reset of an appropriate level, re-transmission, or other processing to deal with the overflow. If, however, a small buffer is free, then at step 375, the incoming packet is stored in the next available small buffer. At step 380, the linked list for the small buffer pool 200 is updated and the free buffer counter 289 is also updated. In another embodiment using an occupied buffer counter, the occupied buffer counter is updated. At step 385, packet history is updated for statistical tracking and possible subsequent memory apportionment if packet size characteristics change on the network. The process then suspends/ends until another packet arrives.

If a large packet (LP) was detected at step 355, then at step 400 (FIG. 6C) a check is made to see if a threshold is being crossed for the number of large buffers now in use (i.e., an amount of unused memory associated with the large buffers has fallen below the predetermined threshold). If a threshold is being crossed then the number of large buffers needs to be increased, so at step 410, a reallocation is triggered to convert small buffers to a large buffer (as described below). If, however, a threshold has not been crossed at step 400, or the triggering at step 410 has occurred, then a check is made at step 420 to see if a large buffer is currently available. If none is available, then at step 460 a buffer overflow sequence is initiated to handle a buffer overflow. If a large buffer is available, then at step 430, the packet is stored in the next available large buffer, e.g., 270a. At step 440, the large buffer pool linked list is updated along with the large packet counts. At step 450, the packet history is updated for statistical reasons. The process then suspends/ends until another packet arrives.

Figure 6C:
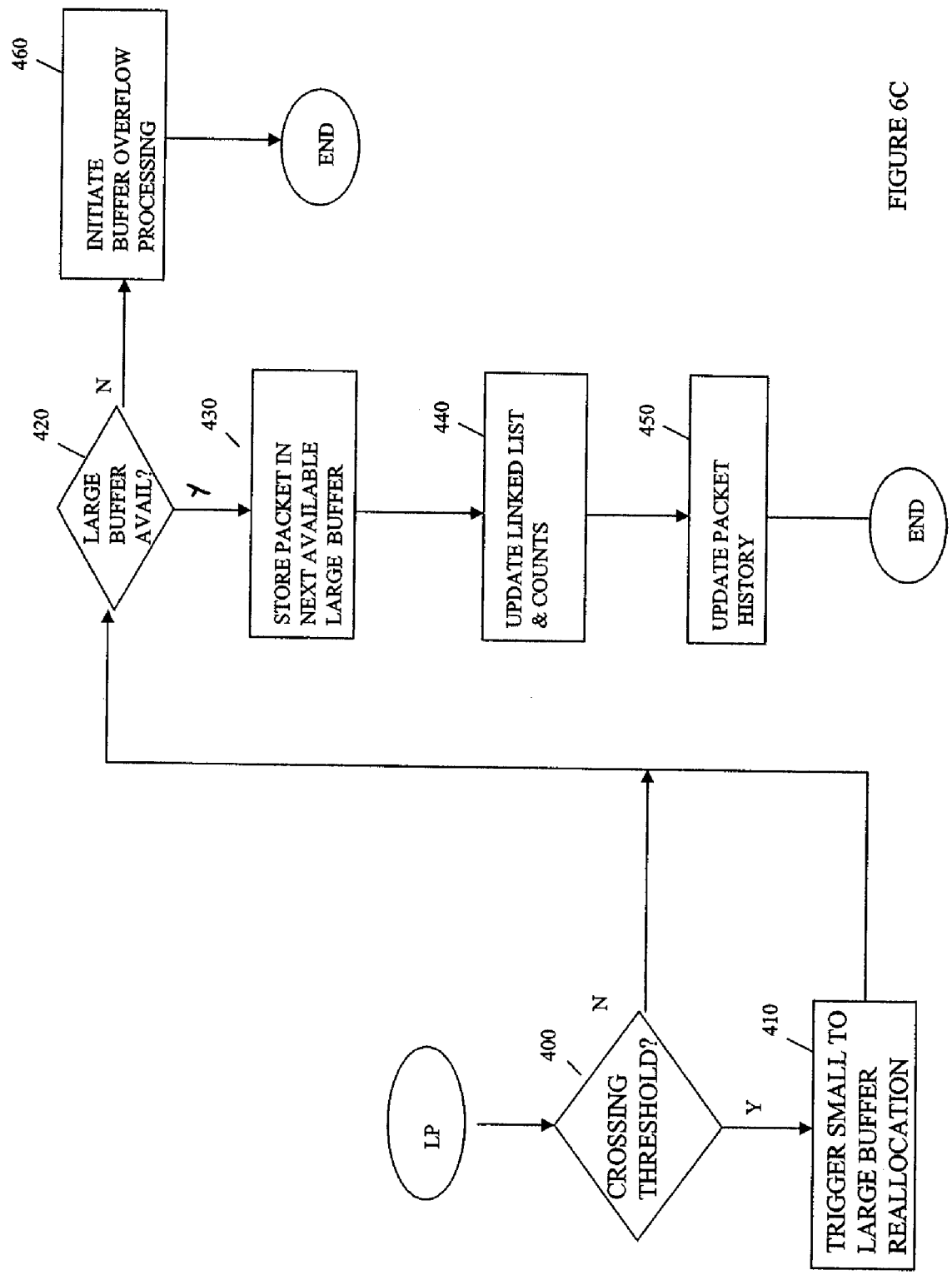
Figure 6D:
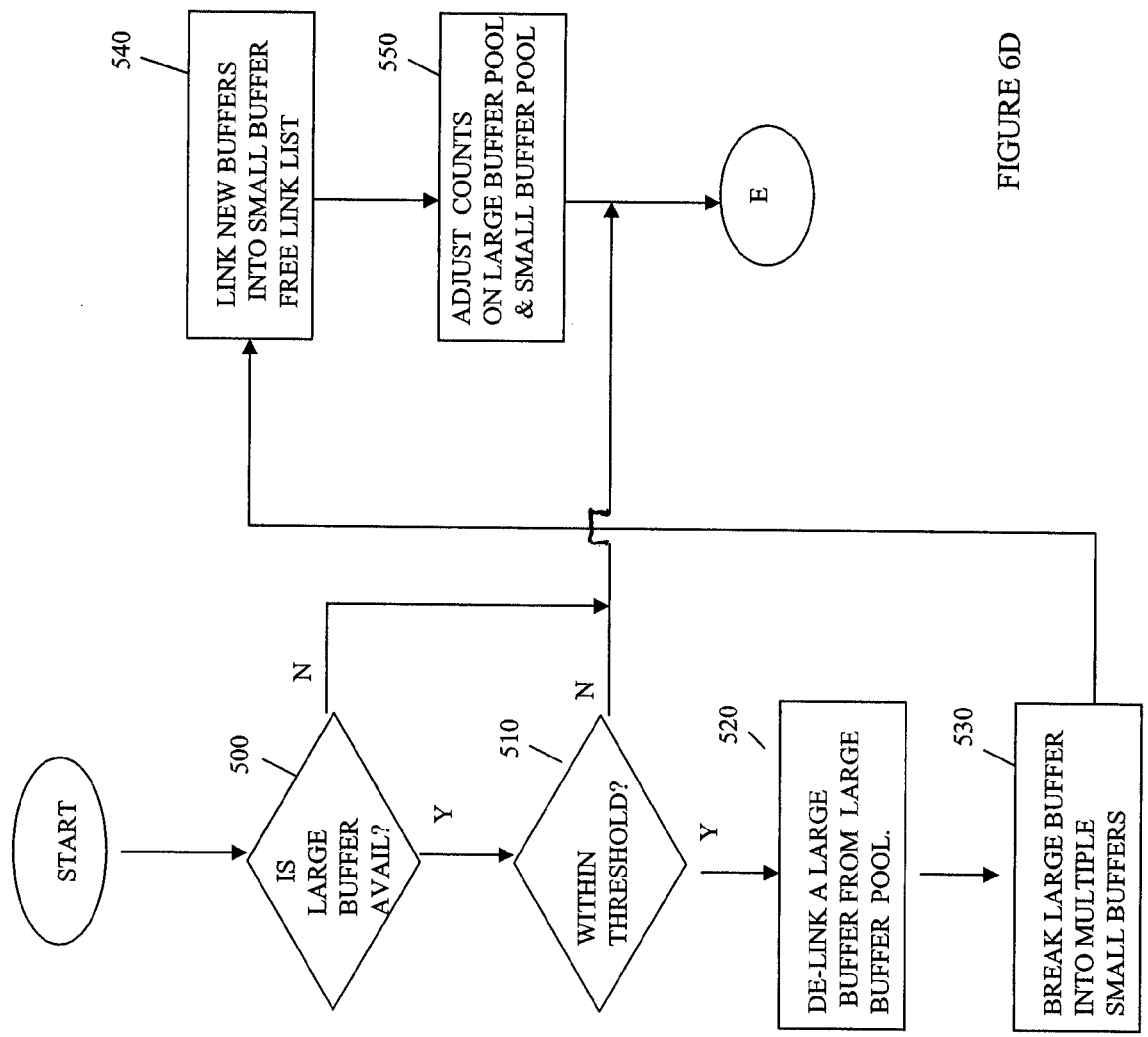

FIG. 6D is a flow diagram showing steps of an embodiment for reallocating a free large buffer 270a into multiple (e.g., 10) small buffers 210. This process was initiated in the flow diagram of FIG. 6B, step 365, and is typically an asynchronous process. At step 500, a check is made to determine if a large buffer is available. If not, this reallocation process ends and no reallocation takes place. If, however, a large buffer is available, then at step 510 a check is made to see if the number of occupied large buffers is over a predetermined threshold. If over a predetermined threshold, then the process terminates and no reallocation takes place. If large buffers are available and the number of occupied large buffers are under a predetermined threshold, then at step 520, a large buffer is delinked from the large buffer pool 250.

Continuing at step 530, the large buffer is broken into multiple smaller buffers. At step 540, the new small buffers are linked into the small buffer pool 200 thereby causing a reallocation of a large buffer into multiple small buffers. At step 550, counts of large and small buffers are updated (e.g., 289). This process may be repeated as necessary to adjust available small buffers or large buffers dynamically as packet traffic varies over time.

Figure 6E:
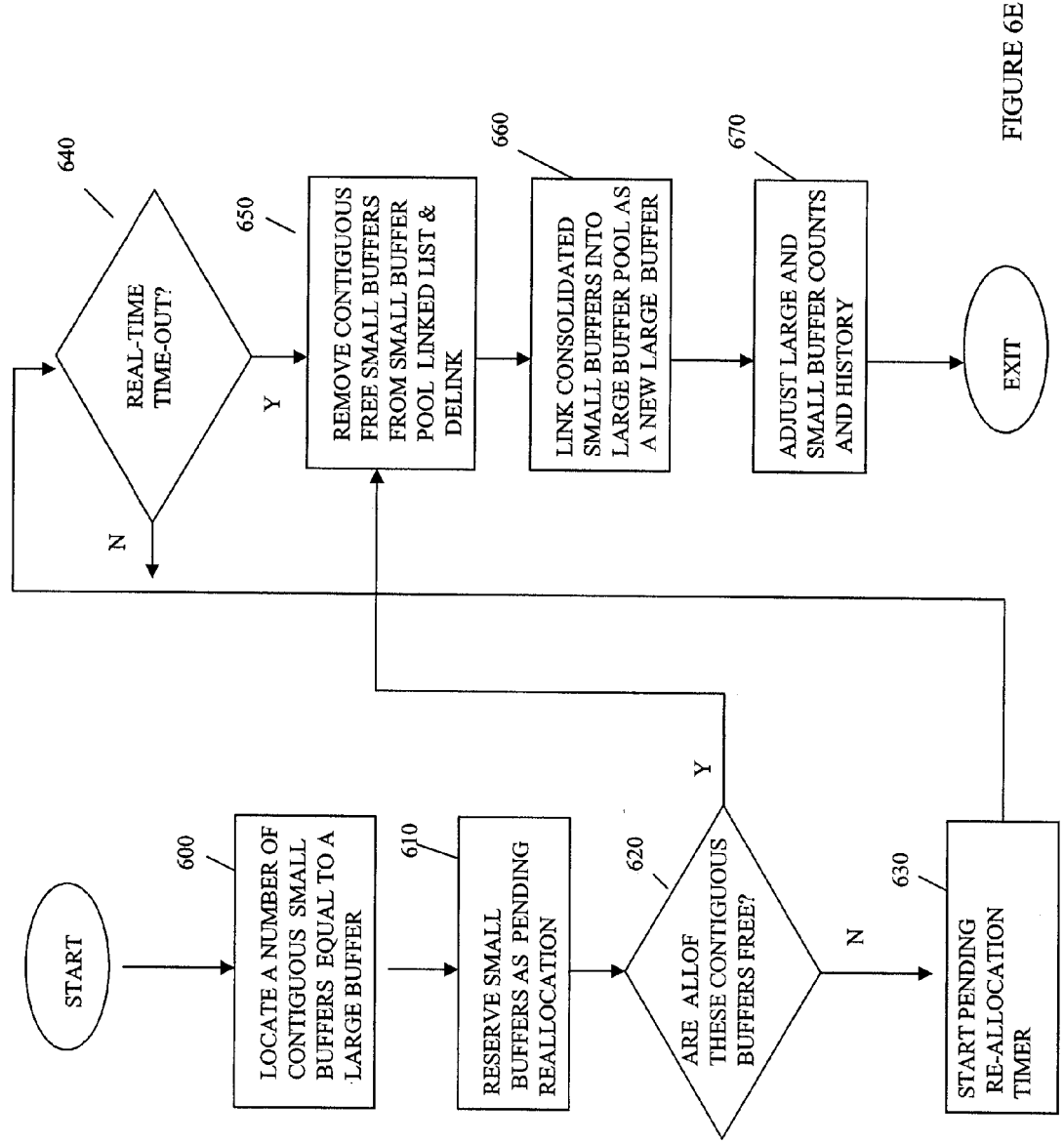

FIG. 6E is a flow diagram showing reallocating free small buffers 210a into a large buffer triggered by step 410 of FIG. 6C and typically occurring asynchronously. At step 600, a number of contiguous small buffers, equal to the amount of memory required to become one or more large buffers, are identified. The allocation boundary pointer 230 is set to this new value. At step 610, these small buffers are reserved as pending reallocation to a big buffer. Any reserved buffer, in embodiments, will not be used to receive any new packets. It is typically necessary to identify contiguous small packets sufficient to equal a large buffer size, as they must eventually be capable of receiving the data of a large packet.

At step 620, a check is made to see if all of the reserved small buffers 210 are currently free. If all are not free buffers (i.e., at least one is occupied), then at step 630 a pending reallocation timer is started, and the reallocation is suspended until the reallocation timer expires and processing resumes at step point 640. This reallocation timer may be used to suspend reallocation for a predetermined period of time sufficient to assure that all incoming packets in the small buffer pool have been processed by the host processor during a reservation period. In other words, the rate of consumption of the incoming packets is based on the network protocol speed and the processing rate associated with the host processor consumption of the incoming packets, therefore the reallocation timer is set to a value to assure all reserved small buffers are free (i.e., processed). Since the small packets were reserved, they were not used to receive any additional incoming packets, and since the reserved buffers were not used to receive any new incoming packets, they are guaranteed to be free.

The small buffer to large buffer reallocation process continues at step 650 (from either step 620 or step 640) where all the reserved free contiguous small buffers are removed and de-linked from the small buffer pool 200. At step 660, the reserved small buffers 210 are consolidated and linked into the large buffer pool 250 as one new large buffer 270. At step 670, large and small buffer counts are adjusted and statistical history is updated. The process ends until another reallocation is triggered.

In another embodiment, a buffer table for recording occupied buffers in the allocated area, may be used. Once an area for reallocation is determined, all occupied buffers in this area are recorded in the buffer table. As each buffer is freed due to packet transmission or aborted because of expiration, a corresponding entry from the table is removed. Once the table is empty, the allocated area is free to be reallocated.

While the invention has been described in terms of embodiments, those skilled in the art will recognize that the invention can be practiced with modifications and in the spirit and scope of the appended claims.

What is claimed is:

1. A method of reallocating buffer memory, the method comprising steps of:
    allocating memory into at least a first portion and a second portion;
    creating a buffer pool in the first and second portion, each buffer in the first portion being substantially equally sized and associated with a predetermined packet size and each buffer in the second portion being substantially equally sized and associated with another predetermined packet size;
    monitoring usage of buffers in each of the first and second portions to determine whether the number of occupied buffers in at least one of the first and second portions crosses a threshold; and
    triggering a reallocation of the memory of the first and second portions when the number of occupied buffers in at least one of the first and second portions crosses a threshold.

2. The method of claim 1, further comprising the step of reallocating one or more buffers from the first portion to the second portion when the number of occupied buffers in the second portion crosses the threshold to provide additional buffer memory to the second portion for more efficient memory utilization.

3. The method of claim 2, wherein the one or more buffers from the first portion are contiguous.

4. The method of claim 2, wherein the reallocating step includes reserving one or more occupied buffers until all reserved occupied buffers become unoccupied.

5. The method of claim 4, wherein the reserving step includes starting a reallocation timer to wait until all reserved occupied buffers become unoccupied before completing the reallocation.

6. The method of claim 1, wherein the size of any buffer in the second portion is an integer multiple of the size of any buffer in the first portion.

7. The method of claim 1, further comprising the step of maintaining a packet history to determine whether a new memory allocation is required based on statistical changes in packet sizes received by a network device.

8. The method of claim 1, wherein the creating step includes creating at least one of a link list structure, a list, and a bitmap to manage all buffers.

9. The method of claim 1, wherein:
    the first portion has small buffers associated with a first range of small packet sizes of the predetermined packet size and the second portion has larger buffers associated with a second range of large packet sizes of the another predetermined packet size;
    and further comprising:
    monitoring usage of buffers in the first portion and the second portion as packets are received;
    reallocating one or more small buffers to the second portion to create a new larger buffer when the amount of occupied larger buffers in the second portion crosses a threshold; and
    reallocating a large buffer to the first portion to create multiple smaller buffers when the amount of occupied buffers in the first portion crosses a threshold thereby providing more efficient use of memory.

10. The method of claim 9, wherein the reallocating step includes reserving one or more contiguous small buffers until all reserved one or more of the contiguous small buffers become unoccupied.

11. The method of claim 10, wherein the reserving step includes preventing new packets from using the one or more contiguous small buffers until the new larger buffer is created.

12. A system for a network device that receives packets of variable length, comprising:
    a memory having a first portion and a second portion, the first portion storing packets having a length less than a predetermined value and the second portion storing packets greater than a predetermined value; and
    a memory system reallocating the memory of the first portion and the second portion when the memory of at least one of the first portion and the second portion crosses a threshold, wherein the first portion of memory contains multiple buffers, each buffer of the first portion sized to store one packet that has a length less than the predetermined value and the second portion of memory contains multiple buffers, each buffer of the second portion sized to store one packet that has a length greater than the predetermined value.

13. The system of claim 12, wherein at least one of the first portion and the second portion stores packets having a length equal to the predetermined value.

14. The system of claim 12, wherein the first portion contains multiple buffers of a first size and the second portion contains multiple buffers of a second size, the second size being a multiple of the first size.

15. The system of claim 12, wherein the memory system reallocates first sized buffers and second sized buffers wherein the first sized buffers are smaller than the second size buffers and the memory system reallocates more than one first sized buffer to create a new second sized buffer when the predetermined threshold is crossed.

16. The system of claim 12, wherein the memory system reallocates first sized and second sized buffers wherein the first sized buffers are smaller than the second size buffers and the memory system reallocates one second sized buffer to create a more than one new first sized buffers when the predetermined threshold is crossed.

17. The system of claim 12, wherein the memory system reallocates buffers in the first portion and the second portion that includes reserving one or more occupied buffers in at least one of the first and second portion until all reserved occupied buffers in the at least one of the first portion and the second portion are unoccupied.

18. The system of claim 17, wherein the memory system starts a reallocation to wait until all reserved occupied buffers in the at least one of the first portion and the second portion are unoccupied before completing the reallocation.

19. The system of claim 17, wherein the memory system uses a table to track the one or more occupied buffers in a reserved area.

20. The system of claim 19, wherein the table is checked at regular time intervals to determine that all buffers in the reserved area are free.

21. The system of claim 19, wherein the table is searched to determine that all buffers in the reserved area are free, and the search is stopped when a first occupied entry is found, and resumes when the found first occupied entry is removed.

22. The system of claim 17, wherein the memory system uses a table to track unoccupied buffers in a reserved area, and checks the table to determine that all buffers in the reserved area are free.

23. A computer program product comprising a computer usable medium having readable program code embodied in the medium, the computer program product includes:
   a first computer program code to allocate memory into at least a first portion and a second portion;
   a second computer program code to create a buffer pool in the first and second portion, each buffer in the first buffer pool being equally sized and associated with a predetermined packet size and each buffer in the second buffer pool being equally sized and associated with another predetermined packet size;
   a third computer program code to monitor usage of buffers in each buffer pool to determine whether the unused buffers in either buffer pool falls below a threshold; and
   a fourth computer code to trigger a reallocation of memory when the unused buffers in either buffer pool falls below a threshold.

* * * * *